H. PRELL.
APPARATUS FOR HEATING, ROASTING, AND COOLING FOOD PRODUCTS.
APPLICATION FILED APR. 27, 1918.

1,398,114.

Patented Nov. 22, 1921.

H. PRELL.
APPARATUS FOR HEATING, ROASTING, AND COOLING FOOD PRODUCTS.
APPLICATION FILED APR. 27, 1918.

1,398,114.

Patented Nov. 22, 1921.

UNITED STATES PATENT OFFICE.

HENRY PRELL, OF CLEVELAND, OHIO, ASSIGNOR, BY MESNE ASSIGNMENTS, TO FREDERICK J. KUHLEMEIER, OF BURLINGTON, IOWA.

APPARATUS FOR HEATING, ROASTING, AND COOLING FOOD PRODUCTS.

1,398,114.  Specification of Letters Patent.  Patented Nov. 22, 1921.

Application filed April 27, 1918. Serial No. 231,234.

*To all whom it may concern:*

Be it known that I, HENRY PRELL, citizen of the United States, residing at Cleveland, in the county of Cuyahoga and State of Ohio, have invented certain new and useful Improvements in Apparatus for Heating, Roasting, and Cooling Food Products, of which the following is a specification.

This invention relates to apparatus for treating food products, and more particularly to apparatus suitable for use in the treatment of any food product by heat, either for drying, roasting, popping, cooking or the like.

One object of the invention is to provide improved apparatus of this kind including a rotating drum in which the material is heated, together with an improved construction and arrangement of parts for circulating air through the material either for drying or cooling the same, and either while in said drum or while in the chamber or reservoir into which the material is discharged therefrom, said air current also serving, when desired, to remove chaff or other foreign substance from the material being treated.

A further object of the invention is to improve the heating devices to enable the same to be more readily installed, removed or replaced, and to simplify and improve the devices for conducting and distributing current thereto.

A further object of the invention is to generally simplify and improve the construction of the drum and its operating mechanism whereby it may be readily opened and closed for discharging the load, to also make it possible at any time to inspect the material being treated or to supply additional material to said drum, and to also improve the driving connections therefor.

A further object of the invention is to provide a machine of this kind including a fan or pump for producing the flow or travel of air through the apparatus for the purposes described, said fan or pump being preferably driven by the same power source which operates the drum, and to also provide the necessary clutches and shock absorbing devices to enable the power source to operate the fan continually and nevertheless to be operatively coupled to the drum when desired.

A further object of the invention is to provide an improved receptacle or container for receiving the material discharged from the drum after treatment therein, said receptacle or container being so arranged as to enable a current of air to be positively moved through the material therein for cooling the same, and which receptacle or container can be readily removed from the casing and is of proper form for convenient manipulation in the disposition of the material after it leaves the machine.

A further object of the invention is to provide improved timing mechanism which can be readily set to produce an alarm at the conclusion of any desired period to obviate the danger of excessive treatment and possible injury to the material.

Finally, another object of the invention is to provide apparatus of this kind which, taken as a whole, is of attractive design and whose parts are coöperatively associated and related in the most convenient and efficient manner and are thereby of simple construction, durable in operation, capable of simple control, and are not liable to get out of order in service.

Further objects of the invention are in part obvious and in part will appear more in detail hereinafter.

The invention comprises the construction and arrangement of parts hereinafter described and claimed.

In the drawings, which represent one suitable embodiment of the invention.

The present apparatus, so far as the sizes and proportions of parts are concerned, may vary somewhat in accordance with the particular duty it is intended to perform. Its uses cover a wide field and may include the roasting of coffee, peanuts, or cereals, the drying or popping of corn, rice or the like, the drying of fruits or vegetables, the toasting of bread, baking or cooking of potatoes or other materials, the heating or drying of coffee substitutes or in fact, the heating, drying, or cooking of any food or other products. For purposes of illustration the drawings show a machine for roasting coffee and in the description hereinafter the product being treated will be referred to as coffee although it will be understood that the invention is not so limited.

The machine shown in the drawings comprises a suitable outer frame or casing which incloses the mechanism and confines the coffee being treated or cooled in a closed chamber properly arranged to enable an air current to be circulated through or over the material. This casing includes a hollow base 1 resting upon the floor or other suitable solid support 2 and upon which is supported the large hollow drum carrying member or jacket 3. The hollow base 1 has an inner chamber 4 in which the coffee may be cooled, as will hereafter appear, and serves to receive a suitable reservoir or container 5 into which the coffee is discharged after treatment by heat, as will appear. The front end of the base 1 is provided near its bottom with an opening to receive a bent pipe or conduit member 6 whose inner end projects into the chamber 4. Its side walls are provided below the jacket 3 with horizontally extending slots or openings 7 protected from the entrance of dirt and dust by overhanging shields 8. The rear end of the base 1 is provided with a hinged door 9 preferably provided on its inner face with a fairly strong inwardly extending spring member 10.

Figure 1:
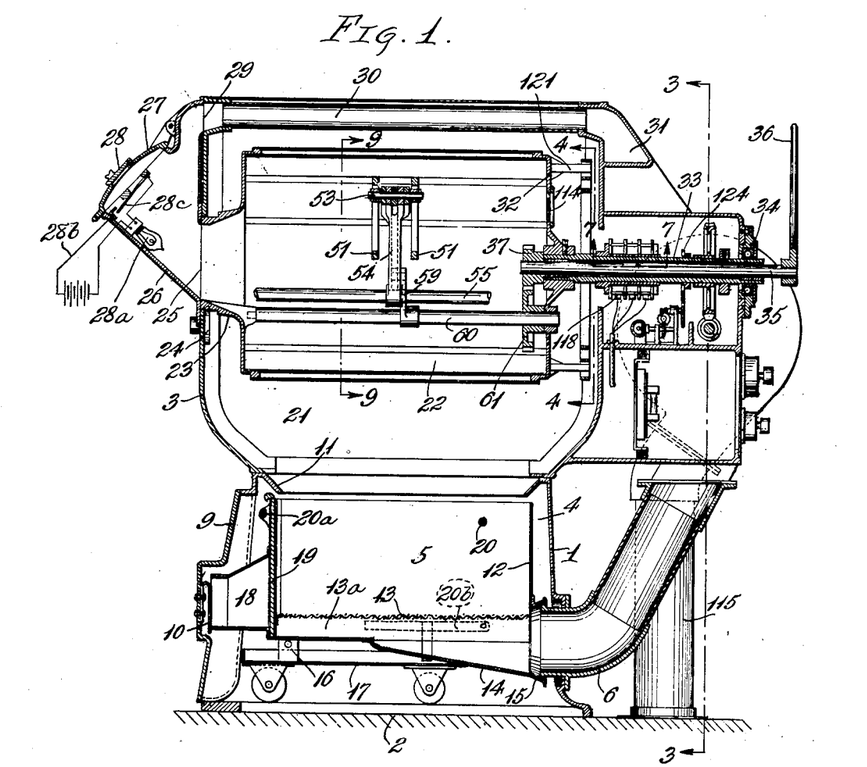
Figure 1 is a longitudinal sectional elevation.

The lower portions of the side and end walls of the jacket member 3 slope inwardly toward the center of the machine, and the upper portions of the walls of the base 1 also slope inwardly, as at 11, to thereby form a hopper bottom for the drum holding portion of the casing. The outlet from the bottom of said hopper is directly over the reservoir or container 5, when the latter is in the base, as shown in Fig. 1. Consequently, material discharged from the drum into the hopper is directed into the container 5 and is not wasted by scattering it in the base of the machine. The container 5 is in the form of a drawer or box having an open top, imperforate side and end walls 12 and a false bottom 13 of fine wire mesh or other suitable perforated material. The perforations therein should be smaller than the smallest grains of material to be treated to avoid loss. Said container also has its bottom provided with a hollow jacket 14 of trough shape and whose depth increases gradually toward the front where it is provided with an outwardly flaring circular mouth 15. When the container is pushed back into the base, as shown in Fig. 1, this mouth surrounds and closely hugs the inner projecting end of the conduit 6, the spring 10 serving to hold it in this position, as a consequence of which any suction or vacuum effect in the conduit 6 is effective in the chamber $13^a$ below the screen and is distributed by the screen 13 over the entire area of material in the container and hence the air current is drawn through the entire mass of material to cool the same or for other purposes.

Figures 9, 10, 11, 12, 16:
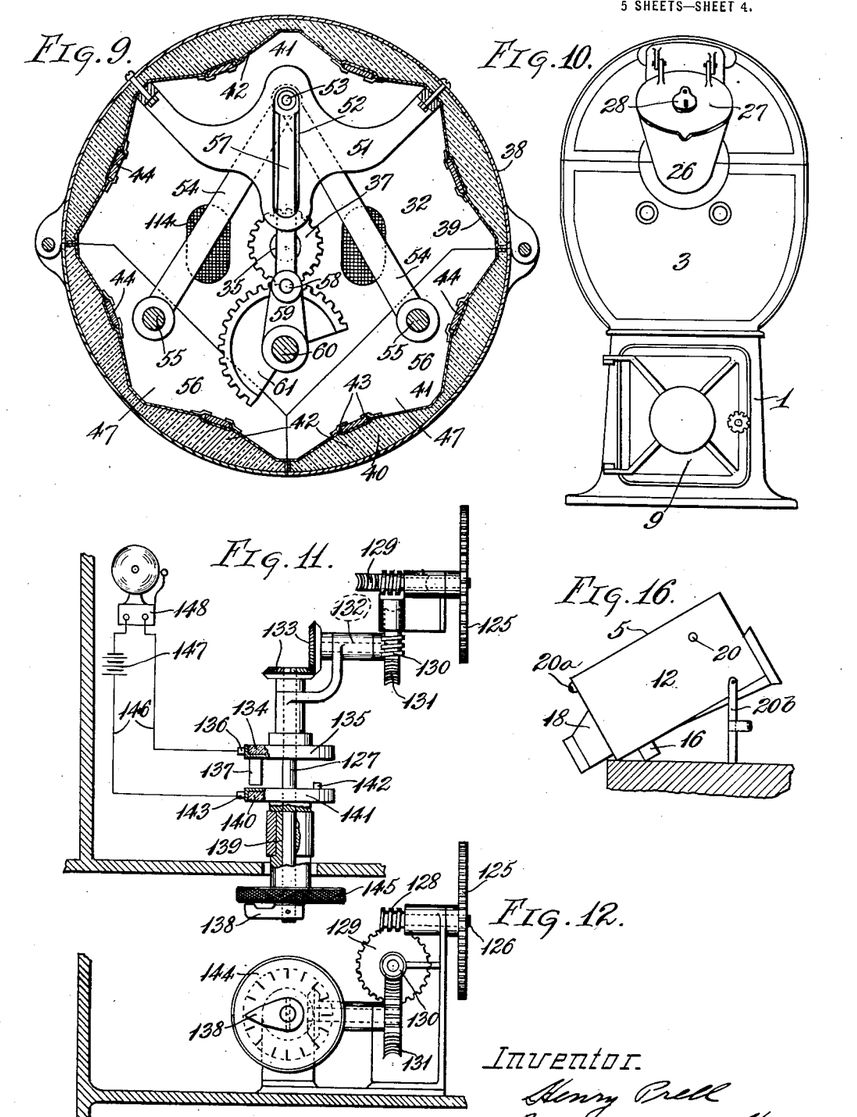
Fig. 9 is a cross section through the drum on the line 9—9, Fig. 1, looking in the direction of the arrows.
Fig. 10 is an outside elevation of the entire machine from the left in Fig. 1.
Fig. 11 is a detail plan view on a larger scale, of the timing mechanism.
Fig. 12 is an elevation thereof, the side casing wall being omitted for clearness of illustration.
Fig. 16 is a detail side elevation of the removable reservoir or container.

The container 12 is shown as provided with short legs 16 resting upon a separate wheeled truck 17, upon which it may be moved from place to place. It may also be provided at one end with a suitable pouring spout 18 which may be closed by a suitable door such as the slide 19. The container will also be provided with suitable lifting and carrying cross rod 20 and handle $20^a$, and may have folding or hinged legs $20^b$ to enable it to be tilted on a table, as shown in Fig. 16, for conveniently discharging the material from the spout.

The upper jacket portion 3 of the casing has an inner chamber 21 in which is located the hollow drum 22 in which the coffee or other material is heat treated. This drum may be of any suitable form and is journaled in the casing for rotating movement on its own axis. For this purpose one end wall of the drum is provided with a hollow tubular portion 23 resting upon suitable antifriction members, such as the rollers 24 journaled in the end wall of the casing 3. Said casing is provided with an opening 25 opposite said sleeve, surrounding which is a hopper member 26 attached to the casing and provided with a hinged door 27, by opening which material to be treated may be poured directly into the drum, even while the latter is rotating. While the treatment is going on the door 27 may be opened for inspection of the material, or said door may also be provided with a small window or a smaller supplemental hinged door 28 to enable the material to be inspected without opening such a wide area. 28ᵃ indicates an electric lamp suitably located in the hopper to illuminate the interior of the drum, said lamp being in a circuit 28ᵇ connected to a suitable source of current and having a spring switch 28ᶜ adapted to be opened when door 27 is closed and to automatically close when said door is opened.

The space within the hopper 26 communicates through an opening 29 with a conduit or passage 30 extending along the inner wall at the top of the casing to the front of the same, and which may be formed by a tubular member held in flanges of the casing, as shown in Fig. 1, or in any other suitable manner. At the front of the casing, passage 30 communicates with passage 31 leading downwardly and whose purpose will appear.

The opposite end wall 32 of the drum is attached to a tubular shaft or sleeve member 33 journaled in a suitable anti-friction bearing 34, and within which is a rotatable shaft 35 provided with an operating handle 36 at its outer end and at its inner end within the drum with a gear 37.

The cylindrical portion of the drum may be formed in any suitable manner and preferably is made of sheet metal, having an outer cylindrical wall 38 and an inner wall 39, the space between said two walls being filled with suitable heat insulating material 40 which confines the heat and directs it inwardly upon the material being treated. The inner wall 39 is made of copper or other good conductor of heat to more quickly distribute the heat from the heating elements throughout the drum, and is also preferably insulated with asbestos or other similar material from the end drum heads and outer drum wall. Said inner wall is preferably corrugated or bent inwardly at intervals to form shallow channels 41 separated by intervening shallow ridges 42 the interrupted surfaces thereby formed, serving when the drum rotates to thoroughly agitate the material being treated. Each inwardly extending projection or ridge 42 is provided with a pair of parallel strips or flanges 43 forming a seat to confine a wide thin longitudinally extending electric heating element 44, whose inner surface is thereby exposed directly to the material in the drum. These heating elements are of well known form and can be purchased in the open market. They are introduced into their respective channels or seats by pushing them in endwise through openings 45 in the end wall of the drum, being held to place in any suitable manner, such as by set screws 46, or the like. The electrical connections thereto will be subsequently described.

Figures 4, 5, 6, 7, 8:
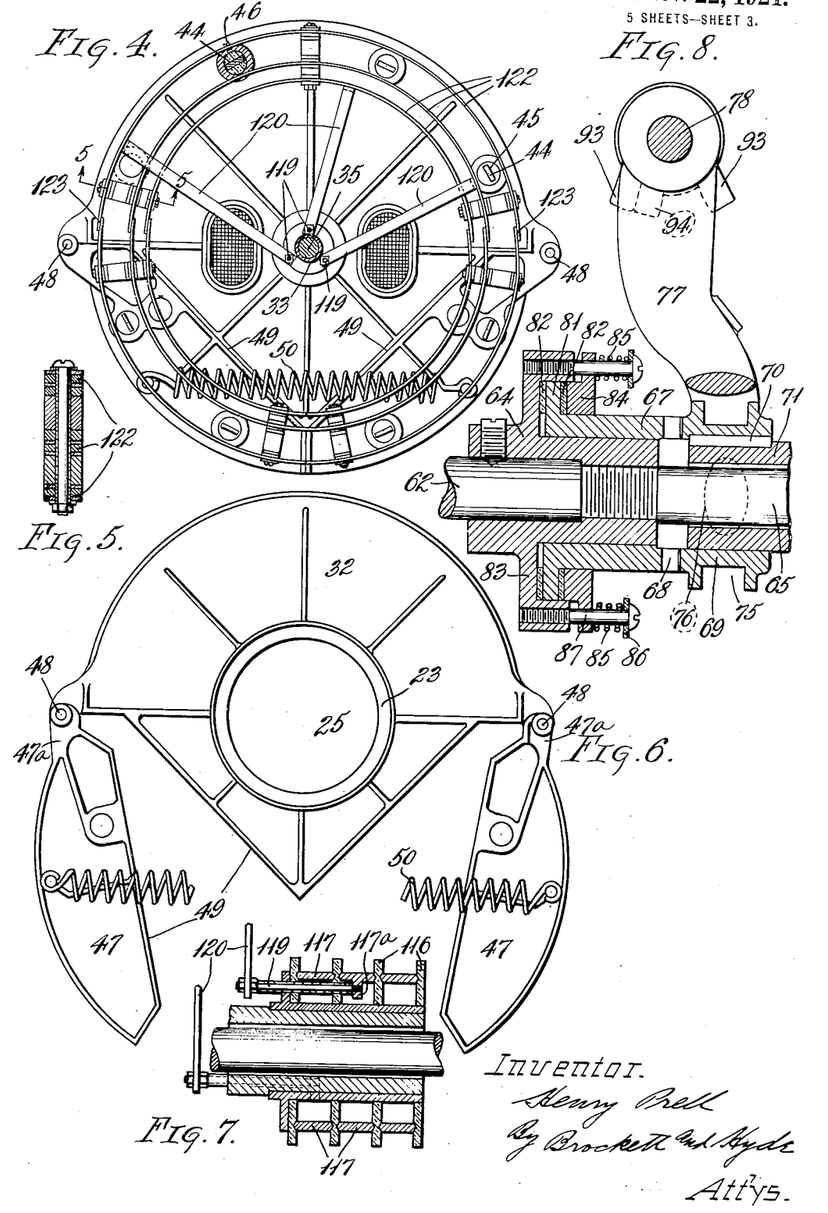
Fig. 4 is a cross section on the line 4—4, Fig. 1.
Fig. 5 is a detail cross section on the line 5—5, Fig. 4.
Fig. 6 is an end view of the drum, from the left in Fig. 1, and showing the drum in discharging position.
Fig. 7 is a detail sectional elevation on the line 7—7, Fig. 1.
Fig. 8 is a detail sectional view of the clutch devices, on the line 8—8, Fig. 14.

The drum 22 is also so formed as to enable the contents thereof to be readily and quickly dumped when desired through the hopper 11 into the container 5. For this purpose the drum has its cylindrical body portion divided to form movable doors. As illustrated in Figs. 6 and 9, there are two such doors 47 having ears 47ᵃ pivoted to the body portion of the drum on the longitudinally extending axes 48, the end drum walls being divided along the lines 49. At each end of the drum the two doors are connected by tension springs 50 tending to maintain them in closed position to thereby prevent escape of material. Any suitable operating mechanism may be provided for opening said drum, preferably some mechanism capable of operation from the outside of the casing without opening the same. For this purpose the larger body portion of the drum is provided with a pair of brackets 51 (Fig. 9) each provided with a radially extending slot 52 to receive a shaft or rod 53 connected by toggle links 54 to longitudinal rods 55 extending between the end wall portions 56 of the two door members. Shaft 53 is also connected by a link 57 to a crank pin 58 on an arm 59 carried by a shaft 60 on which is a gear segment 61 meshing with the gear 37 before referred to. Consequently, by turning the shaft 35 relative to the drum sleeve 33 the arm 59 will advance the shaft 53 from the position shown in Fig. 9 toward the axis of the drum, thereby opening the toggle links 54 and moving the door portions 47 of the drum to the positions shown in Fig. 6. The drum is opened as described only when the doors are at the bottom of the drum, suitable devices to be described being provided for insuring their operation only when in this position, and when said doors are opened all of the material in the drum is discharged directly into the container 5.

Figure 3:
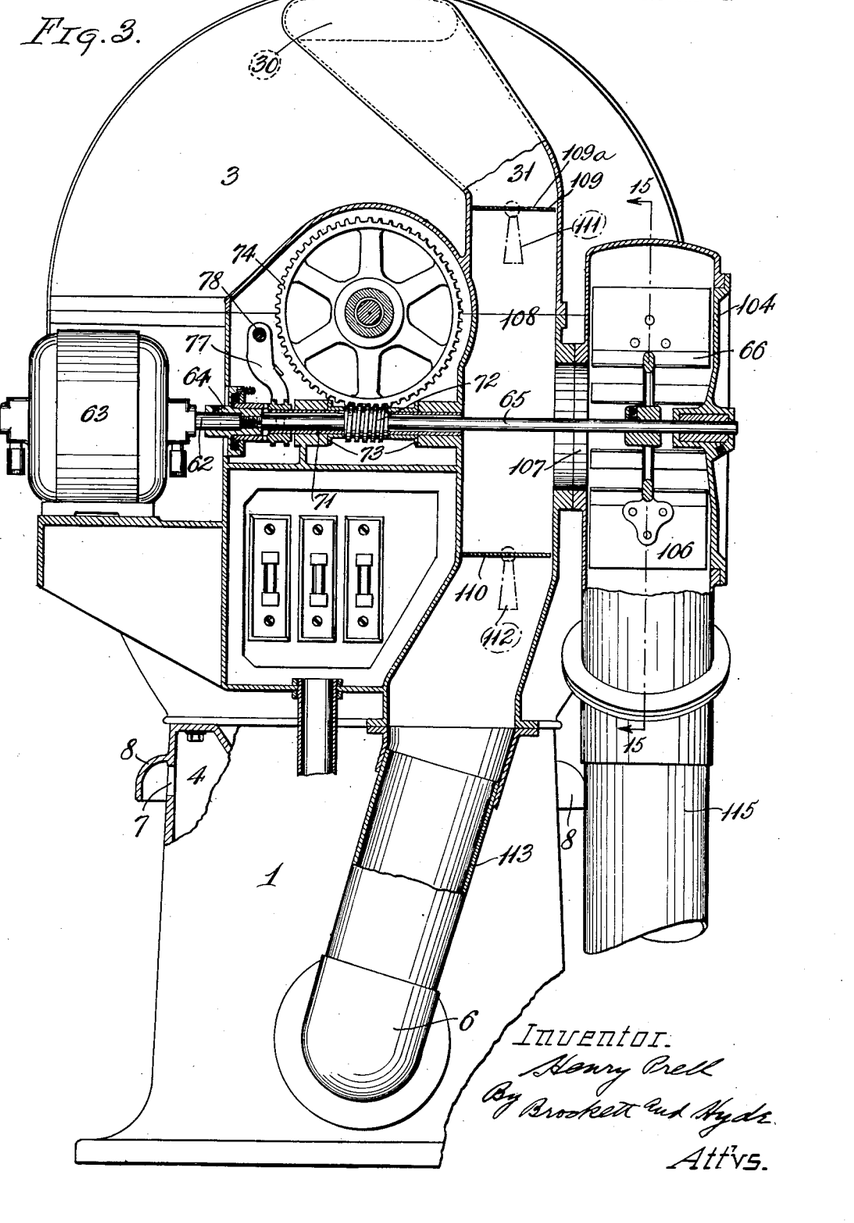
Fig. 3 is a transverse sectional elevation, on a larger scale, on the line 3—3, Fig. 1, looking in the direction of the arrows.

The machine may be driven by any suitable source of power. 62 represents the main driving shaft of the machine, which is connected to a suitable source of power such as the electric motor 63. Shaft 62 carries a sleeve 64, which rotates therewith and to which is connected a long shaft 65 extending crosswise of the machine at its front end. Said shaft, at its opposite end, carries a fan 66 whose purpose is to produce air flow through the casing in a manner to be described. The connection between the motor and shaft is direct because the fan 66 runs continuously or without stop. The drum, however, is rotated only from time to time as may be necessary for treatment of material therein, and at intervals is stopped for discharge of the load. Therefore clutch devices are interposed between the motor and drum, said clutch devices including a suitable shock absorbing device to avoid injury to the motor and driving mechanism when applying thereto the load of rotating the drum. Referring to Figs. 3 and 8 it will be observed that sleeve 64 carries a clutch sleeve 67 provided at one end with clutch teeth 68 coöperating with the teeth of a clutch member 69 having a splined or other suitable driving connection 70 with a sleeve 71 surrounding the shaft 65. Said sleeve 71 carries a worm 72 having thrust collars 73 lying opposite solid shoulders of the frame and said worm coöperates with and drives a worm gear 74 mounted to rotate with the drum and sleeve 33. Clutch member 69 has the usual annular groove 75 to receive pins 76 on the yoke portion of an arm 77 mounted on a shaft 78 which extends outwardly through a wall 79 of the casing, (Fig. 14) and is provided with an operating handle 80. When the clutch is moved to the left in Figs. 8 and 13 driving connection is established between the sleeve 67 and drum, so that the latter is driven. The shock absorbing devices referred to are interposed between the sleeves 64 and 67 and, as shown, comprise a collar or flange 81 (Fig. 8) on the sleeve 67 lying between frictional clutch rings 82 clamped between a flange 83 of the sleeve 64 and a collar 84 slidable upon the sleeve 67. Said collar 84 is pressed toward the flange 83 by a series of tension springs 85 lying between said collar and washers 86 beneath the heads of screws 87 threaded through the collar into the flange 83, and which screws enable the frictional holding ability of the clutch to be adjusted to the proper degree and also for taking up wear.

Suitable means is also provided for insuring opening movement of the drum doors only when the drum is in proper discharging position with the doors downwardly, as in Fig. 6. This is accomplished by a mechanism which definitely stops the drum in said position each time the clutch is disconnected. The operating handle 36 for the shaft 35 is removable and is preferably taken off when the drum is rotating, so that there is no liability of opening the drum while it is rotating. On the drum sleeve 33 is a collar or flange 88 provided with a notch or recess 89 having an inclined wall 89ª. Opposite said collar is a stationary tubular boss 91 in which is a slidable plunger 90 whose inner end is adapted to enter the recess 89, and whose opposite end coöperates with an ear or projection 92 upon the clutch actuating arm 77. Said arm is loosely rotatable upon the shaft 78 and is provided with two spaced ears 93 between which is a projection 94 carried by a member 95 fixed to rotate with the shaft 78, said member 94 having lost motion between the ears 93. Shaft 78 is also provided with a member 96 rotatable therewith and carrying a tubular boss 97 in which is a plunger 98 pressed outwardly by a compression spring 99 and carrying a roller 100 working on a stationary cam 101 having opposite cam faces 102 inclined downwardly in both directions from the crest 103.

Figure 13:
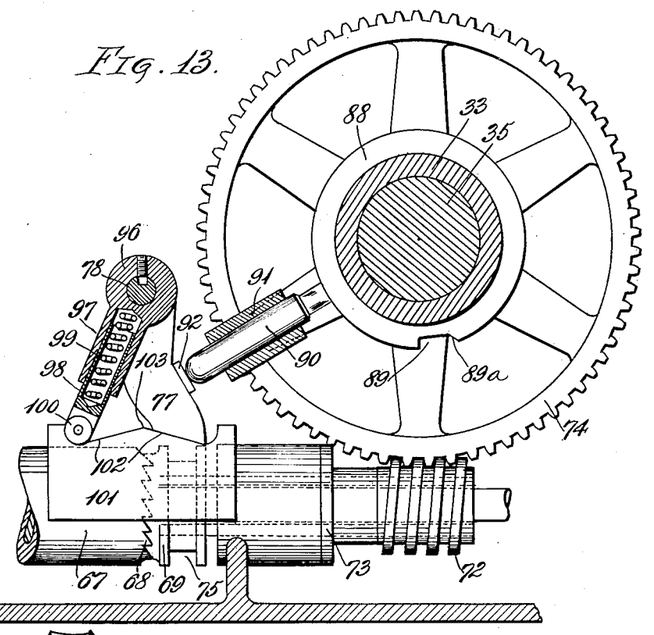
Fig. 13 is a detail view, partly in section, illustrating the clutch control mechanism.
Figure 14:
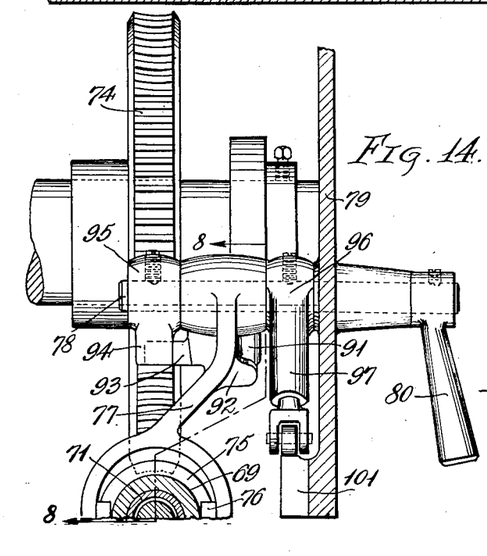
Fig. 14 is an elevation thereof from the left in Fig. 13, the driving shaft and clutch being shown in section.
Figure 15:
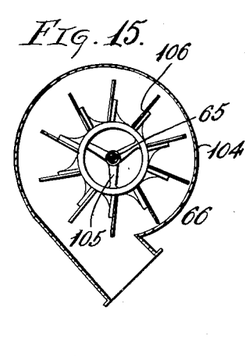
Fig. 15 is a detail sectional elevation on the line 15—15, Fig. 3.

Fig. 13 shows the clutch 69 engaged with the clutch sleeve 67 to establish driving connections to the drum. When it is desired to stop the drum for discharge of the load therefrom handle 80 is turned to rotate shaft 78 in the counter-clockwise direction, (Fig. 13). The lost motion of the lug 94 between ears 93 enables said shaft to be rotated until the roller 100 passes beyond the crest 103 of the cam. Further motion in this direction is limited by the plunger 90 which prevents movement of arm 77 to open the clutch until the recess 89 reaches registering relation with said plunger. When this relation is reached the spring 99 acting on the inclined cam surface 102 produces further motion of shaft 78 in the same direction, thereby causing the plunger 90 to enter the recess 89. The clutch is thereby uncoupled and the drum is stopped in definite position with its doors downwardly. By applying the handle 36 to its shaft 35 the drum doors can then be opened.

After the drum is dumped and closed it can be refilled and started or started immediately and then refilled. The drum is started by throwing the clutch shifting handle 80 in the opposite direction to produce clock-wise motion of shaft 78 in Fig. 13, the clutch 69 being immediately engaged with clutch sleeve 67. The inclined wall 89ª assists gravity in release of the lock plunger 90. When clutch engagement is effected the motor shaft sleeve 83 at first slips relative to the collar 81 until the friction clutch is able to gradually start the drum and take up the full load, whereupon slippage ceases at the friction clutch and the drum is driven at full speed.

Circulation of air through the machine may be produced in any suitable manner, such as by a reciprocating or rotary pump, or by a rotary centrifugal fan. The fan 66 illustrated in the drawings for this purpose comprises a suitable hollow casing 104 carried by the frame and in which rotates the shaft 65 before referred to. Said shaft, near its outer end within said casing 104 is provided with a spider 105 whose arms are each provided with a fan blade 106. These blades are flat members disposed not radially but slightly tangentially to the axis of shaft 65. The construction is simple, light and quite efficient. The axial inlet to said fan, indicated at 107, communicates with a vertically extending passage 108 provided above and below said inlet with suitable regulating valves, such as the rotatable dampers 109, 110 having operating handles 111, 112, located on the outside of the casing. Passage 108, above the damper 109, communicates with the passage 31 before referred to, and below the damper 110 communicates by way of a pipe 113 with the pipe or conduit 6. The drum 22, at its front end, is provided with one or several air openings 114, preferably screened to prevent loss of material. The outlet from the fan communicates with a conduit 115, preferably leading downwardly at the front of the machine, and which may either discharge into the open atmosphere, or may lead through the floor to the outside of the building or to any other suitable point.

The arrangement just described enables the circulation of air to be varied or altered according to the particular requirements of the roasting or drying operation. The air inlet to the casing is always by way of the slots 7. By closing damper 110 air flow through the bottom of the casing and conduit 6 is prevented. The air flows however, upwardly to the front end of the drum, thence through the screened openings 114 and by way of the opening 25 to passage 30, and thence to the fan and to the outlet. This path is used for example, when drying a food product or to convey therefrom steam or gases of decomposition. In roasting coffee, for example, the coffee is heated in the rotating drum and the damper 109 partially opened to permit a gentle current of air to flow through the drum and thereby carry away moisture and dry the material. When desired, the damper 109 can be opened wide so as to produce a sudden blast or full strength current of air through the drum to thereby carry off chaff or other undesirable foreign material. Preferably also the damper 109 has a small opening 109ª so that a small quantity of air is always flowing through the drum to carry away moisture.

By more or less opening the damper 110, more or less of the air admitted to the casing is directed from the inlet 7 downwardly over the material in the container 5 and thence by way of the chamber 13ª and channel 14 to the conduit 6 and thence to the fan. This path for the air current is utilized, for example, when cooling a charge of heat treated material after the same has been discharged from the drum. It will, of course, be understood that circulation of air may be maintained along either path alone, or along both paths simultaneously, as may be necessary. In this way one charge of roasted coffee, for example, can be cooled in the base of the machine while a second charge is being treated or roasted in the drum.

The apparatus is also arranged to conserve both heat and current. The double walled drum with its lining 40 of heat insulated material, said lining being thickest directly opposite the several heating elements 44, conserves practically all of the heat and directs the same inwardly upon the material in the drum. The electrical connections to the several resistance elements are also of efficient construction. As illustrated the drum sleeve 33 carries a series of spaced insulating disks 116 between each two of which is supported a tubular current conducting ring member 117. Each of said members has a continuous cylindrical outer surface to coöperate with a suitable brush 118 connected to the current leads. Each of the three members 117 on its inner surface has an ear 117ª connected to a rod 119 extending through openings in the adjacent insulating disks 116. The three rods 119 are preferably spaced around the axis of shaft 35 and at their inner ends are connected to conducting bars 120. The larger or body portion of the drum at its front end is provided with insulating posts 121 which support in insulated relation a series of circumferentially extending copper bars 122, preferably three in number, and each of which is connected to the outer end of one of the upwardly extending bars 120. While each of the bars 122 extends entirely around the drum, it will, of course, be understood that each of said bars is in three sections, to wit, a long section carried by the larger or body portion of the drum, and two smaller sections carried by the swinging doors thereof. Opposite the hinges of said doors the ends of the adjacent bar members overlap, as at 123, this arrangement enabling the doors to be opened and providing a slight wiping or sliding movement of the yielding ends of the bars upon each other when the doors are closed, to thereby produce full electrical contact therebetween. Electrical connections are taken off from the several bars to the several heating elements by short wire sections in a manner requiring no special description.

The machine is also preferably provided with timing mechanism serving to warn the operator when the cooking, drying, roasting or heating operation is substantially concluded. The mechanism for this purpose is illustrated in Figs. 1, 11, and 12. It comprises a gear 124 upon the drum sleeve 33 which meshes with a gear 125 on a shaft 126 journaled in a suitable support carried by the frame. Said shaft is connected by a suitable reducing gearing to a shaft 127, so that the latter shaft rotates slowly as compared with the rotation of the drum. The speed reducing gearing shown comprises a worm 128 on shaft 126 meshing with a worm gear 129 on a shaft carrying a worm 130 meshing with a worm gear 131 on a shaft 132 connected by beveled gears 133 to said shaft 127. The latter shaft carries an insulating disk 134 provided with a current conducting ring 135 coöperating with a brush 136 and also carrying a spring contact member 137. Shaft 127 extends to the outside of the casing, where it is provided with a pointer 138, preferably in registering relation circumferentially of the shaft with the contact 137. On the shaft 127 is a sleeve 139 connected at its inner end to an insulating disk 140 on which is a current conducting ring 141 carrying a contact 142 and coöperating with a brush 143, while the outer end of the sleeve is provided with a large disk 144 whose periphery may be milled, as at 145, and which is provided on its face with suitable divisions coöperating with the pointer 138 and which indicate periods of time, such as minutes. The brushes 143 are in an electric circuit 146 connected to a source of current 147, such as a battery or an ordinary bell ringing transformer, and a suitable bell 148.

By turning the dial 144 the contact 142 is moved away from the contact 137, the position of the pointer 138 on the scale indicating the period of time necessary to advance the contact 137 by rotation of the drum until the circuit is connected across the contacts 137, 142. The dial can be set for any desired period of time, at the conclusion of which the circuit is completed and the bell rings to advise the operator that the heating or cooking operation is concluded.

Figure 2:
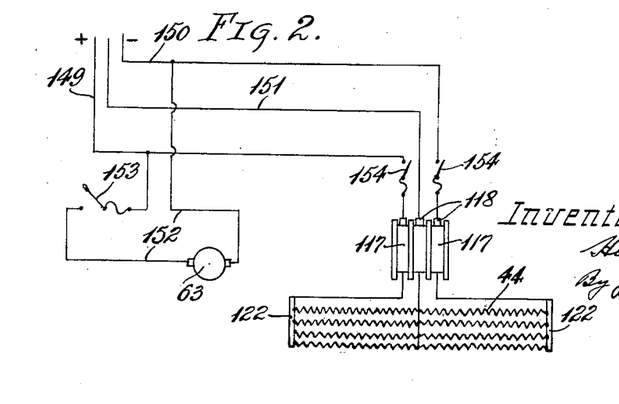
Fig. 2 is a diagrammatic view of the electric circuits.

Fig. 2 illustrates diagrammatically the electric circuits when employing a three wire system. 149 and 150 represent the positive and negative lead wires, while 151 represents the intermediate or neutral wire. The motor 63 is in a circuit 152 across the line, in which circuit is a switch 153 preferably located, as shown in Fig. 1, at the front of the machine. The two end ones of the conducting members 117 are connected by way of switches 154 to the line wires 149 and 150, said switches 154 being preferably located adjacent to the switch 153 for convenience of operation. The several heating elements 44 are in two groups connected by means of the bars 122 between the middle and end rings 117, the middle one of said rings being connected to the neutral wire 151. This arrangement enables either group or both groups together of heating elements to be switched into the circuit, and by proper distribution of the heating elements the heating effect may be varied.

The same arrangement of current conducting members is also adapted for use with a two wire source of current, one of the lead wires being connected to the middle ring 117 and the other to the two end rings.

The apparatus described is of relatively simple construction, is easy to manipulate and control, and provides means for carrying on the cooking, heating, and roasting of food products or other materials with exactness.

What I claim is:

1. In apparatus of the class described, a jacket, a rotary drum located in the upper part of said jacket, a removable container located within the lower part of said jacket, said drum being adapted to discharge into said container and said container having an open top, a perforated false bottom and a lower chamber below said false bottom and provided with imperforate bottom and side walls, and means for establishing suction, one of the walls of said chamber having detachable connection with said suction-establishing means.

2. Apparatus of the class described, comprising a hollow jacket, a conduit therein communicating with a source of suction, and a container within said jacket detachably connected to said conduit, said jacket being provided with a door for removal of said container and said door being arranged when closed to maintain the connection of said container to said conduit.

3. Apparatus of the class described, comprising a hollow jacket, a conduit therein communicating with a source of suction, and a container within said jacket having a perforated wall and a conduit member outside of said wall, said container conduit having a bell-shaped mouth adapted to surround said jacket conduit.

4. Apparatus of the class described, comprising a hollow jacket, a conduit therein communicating with a source of suction, a container within said jacket having a perforated wall and a conduit outside of said wall, said container conduit having a bell-shaped mouth adapted to surround said jacket conduit, and yielding means for maintaining said container with its conduit connected to said jacket conduit.

5. Apparatus of the class described, comprising a jacket having an air inlet opening, a rotary drum therein, a reservoir beneath said drum, and means for producing a current of air from said inlet opening upwardly through said drum and downwardly through said reservoir.

6. In apparatus of the class described, a jacket having an air inlet, a rotary drum located within said jacket, a container located within said jacket beneath said drum, said drum being adapted to discharge into said container, and means for producing a current of air at will through said drum alone or alternatively through said container alone.

7. In apparatus of the class described, a jacket having an air inlet, a rotary drum located within said jacket, a container located within said jacket beneath said drum, said drum being adapted to discharge into said container, and means for producing a current of air at will from said air inlet simultaneously through said drum and through said container, or through said drum alone or through said container alone.

8. Apparatus of the class described, comprising a jacket having an air inlet opening, a rotary drum therein communicating at one end with said opening, a conduit communicating with the other end of said drum, a reservoir in said jacket below said drum and exposed on one side to said inlet opening, a conduit communicating with the other side of said reservoir, a source of suction, and means for rendering said suction effective in either of said conduits.

9. Apparatus of the class described, comprising a hollow jacket having a base and an upper portion, the bottom of said upper portion being of hopper form, a drum rotatable in the upper portion of said jacket, a container beneath the hopper portion thereof, and means for circulating air through either the upper portion or the base of said jacket.

10. Apparatus of the class described, comprising a jacket, a rotatable drum therein, hinged doors therefor, and toggle means for operating said doors.

11. Apparatus of the class described, comprising a jacket, a rotatable drum therein, hinged doors therefor, and toggle means operable from the outside of said jacket for actuating said doors.

12. Apparatus of the class described, comprising a jacket, a rotatable drum therein, hinged doors therefor, and toggle means within said drum and operable from the outside of said jacket for actuating said doors.

13. Apparatus of the class described, comprising a jacket, a rotatable drum therein provided with a tubular driving shaft, doors for said drum, toggle mechanism within said drum connected to said doors, and operating means therefor extending through said shaft to the outside of the jacket.

14. Apparatus of the class described, comprising a jacket, a rotatable drum therein provided at one end with an axially disposed filling opening and at its opposite end with a tubular driving shaft, a movable door for said drum, operating mechanism for said door extending through said shaft, and means for producing a flow of air into the driving end of said drum and out through the filling opening at the opposite end.

15. Apparatus of the class described, comprising a jacket, a rotatable drum therein, driving means therefor including a clutch, and means effective when said clutch is released for stopping the drum in a definite position.

16. Apparatus of the class described, comprising a jacket, a rotatable drum therein, a movable door for said drum, drum driving means including a clutch, and means adapted when said clutch is released to stop the drum with the door below the same.

17. Apparatus of the class described, comprising a jacket, a rotatable drum therein, a movable door for said drum, drum driving means including a clutch, means adapted when said clutch is released to stop the drum with the door below the same, and means operable from the outside of said jacket for actuating said door.

18. Apparatus of the class described, comprising a jacket, a rotatable drum therein, and driving means therefor including both a friction and a positive clutch.

19. Apparatus of the class described, comprising a jacket, a rotatable drum therein, driving means therefor including both a friction and a positive clutch, and means associated with said clutches for determining the position of the drum when a clutch is released.

20. Apparatus of the class described, comprising a jacket, a rotatable drum therein, suction producing means, motor means positively connected thereto, and a friction and a positive clutch operatively connecting the motor means and drums.

21. Apparatus of the class described, comprising a jacket, a rotatable drum therein, suction producing means, motor means positively connected thereto, a friction and a positive clutch operatively connecting the motor means and drum, and means associated with said clutches for determining the position of said drum when a clutch is released.

22. Apparatus of the class described, comprising a rotary heating drum having a circumferentially corrugated inner surface, and electric heating elements located in the ridges of said corrugations and exposed to the chamber within said drum.

23. Apparatus of the class described, comprising a rotary heating drum having a cylindrical outer wall and a corrugated inner wall, heating elements therein, and a heat insulating lining between said walls, said heating elements being insertible or removable endwise through the end of the drum.

24. Apparatus of the class described, comprising a rotary heating drum having a cylindrical outer wall and a corrugated inner wall, heating elements therein, and a heat insulating lining between said walls, said heating elements being insertible or removable endwise through the end of the drum and being exposed to the chamber therein.

25. Apparatus of the class described, comprising a rotary heating drum including end heads and a cylindrical outer wall, and electrical heating elements carried by said wall and insertible to position therein through openings in the end heads.

26. Apparatus of the class described, comprising a rotary heating drum including end heads and a cylindrical outer wall, electrical heating elements carried by said wall and extending through said end heads, and annularly extending current-conducting bars carried by one of said heads and electrically connected to said elements.

27. Apparatus of the class described, comprising a rotary heating drum including end heads and a cylindrical outer wall, electrical heating elements carried by said wall and extending through said end heads, annularly extending current-conducting bars carried by one of said heads and electrically connected to said elements, and means for distributing current to said bars.

28. Apparatus of the class described, comprising a rotatable drum including end heads and a cylindrical body portion, doors for said drum each including portions of said heads and body, electric heating elements carried by the body portion of said drum, and circumferentially extending current-conducting bars for said elements carried by said end heads.

29. Apparatus of the class described, comprising a rotatable drum including end heads and a cylindrical body portion, doors for said drum each including portions of said heads and body, electric heating elements carried by the body portion of said drum, and circumferentially extending current-conducting bars for said elements carried by said end heads, the portions of said bars carried by said doors being movable with said doors relative to the remaining portions of the bars.

30. Apparatus of the class described, comprising a rotatable drum including end heads and a cylindrical body portion, doors for said drum each including portions of said heads and body, electric heating elements carried by the body portion of said drum, circumferentially extending current-conducting bars for said elements carried by said end heads, the portions of said bars carried by said doors being movable with said doors relative to the remaining portions of the bars, a driving shaft for said drum, and means carried by said shaft for distributing current to said bars.

31. Apparatus of the class described, comprising a rotatable heating drum, a driving shaft therefor, and timing mechanism also driven by said shaft.

32. Apparatus of the class described, comprising a rotatable heating drum, a driving shaft therefor, and timing mechanism also driven by said shaft and including a device adapted to close after a predetermined period of time, and an alarm actuated by said device.

33. Apparatus of the class described, comprising a rotatable heating drum, a driving shaft therefor, and timing mechanism also driven by said shaft and including a device adapted to close after a predetermined period of time, an alarm actuated by said device, and means for setting said device for any period of time.

34. In a coffee roaster, a jacket, an upper rotary drum located within said jacket and having means for heating and agitating the berries, a lower container having an open top and a screen bottom, said drum having two hinged doors closing the entire bottom thereof and operable to instantly dump the entire contents substantially as a whole into said container, said jacket having an air inlet, and means for inducing a suction draft of air downwardly and equally through all portions of the contents of said container.

In testimony whereof I affix my signature.

HENRY PRELL.